(12) United States Patent
Ferrari

(10) Patent No.: US 10,189,199 B2
(45) Date of Patent: Jan. 29, 2019

(54) HIGHLY MODIFIED POLYESTERS FOR CONTAINERS

(71) Applicant: M & G USA CORPORATION, Apple Grove, WV (US)

(72) Inventor: Gianluca Ferrari, Portograuaro (IT)

(73) Assignee: DISCMA AG, Zürich (CH)

( * ) Notice: Subject to any disclaimer, the term of this patent is extended or adjusted under 35 U.S.C. 154(b) by 154 days.

(21) Appl. No.: 14/915,103

(22) PCT Filed: Aug. 29, 2014

(86) PCT No.: PCT/US2014/053468
§ 371 (c)(1),
(2) Date: Feb. 26, 2016

(87) PCT Pub. No.: WO2015/031784
PCT Pub. Date: Mar. 5, 2015

(65) Prior Publication Data
US 2016/0207242 A1      Jul. 21, 2016

Related U.S. Application Data

(60) Provisional application No. 61/872,233, filed on Aug. 30, 2013.

(51) Int. Cl.
| | | |
|---|---|---|
| *B29C 49/00* | (2006.01) |
| *B29C 49/46* | (2006.01) |
| *C08J 5/00* | (2006.01) |
| *B29K 67/00* | (2006.01) |
| *B29C 49/06* | (2006.01) |
| *B29K 105/00* | (2006.01) |
| *B29L 31/00* | (2006.01) |

(52) U.S. Cl.
CPC .......... *B29C 49/0005* (2013.01); *B29C 49/46* (2013.01); *C08J 5/00* (2013.01); *B29C 49/06* (2013.01); *B29C 2049/465* (2013.01); *B29C 2049/4664* (2013.01); *B29K 2067/00* (2013.01); *B29K 2067/003* (2013.01); *B29K 2105/258* (2013.01); *B29K 2995/0041* (2013.01); *B29L 2031/7158* (2013.01); *C08J 2367/02* (2013.01)

(58) Field of Classification Search
CPC .................. B29C 49/005; B29C 49/46; B29C 2049/4664; B29C 2949/00; B29C 49/00; C08J 5/00; B29K 2067/003
See application file for complete search history.

(56) References Cited

U.S. PATENT DOCUMENTS

| | | |
|---|---|---|
| 5,556,675 A | 9/1996 | Yamamoto et al. |
| 2003/0121635 A1 | 7/2003 | Kumamoto et al. |
| 2004/0113328 A1 | 6/2004 | Hekal |
| 2005/0196566 A1* | 9/2005 | Colhoun .................. B29B 9/12 428/35.7 |
| 2005/0206045 A1 | 9/2005 | Desanaux et al. |
| 2007/0082157 A1* | 4/2007 | Heater .................... B32B 27/18 428/35.7 |
| 2010/0044266 A1 | 2/2010 | Lenges et al. |
| 2010/0316824 A1* | 12/2010 | Knudsen .................. C08L 9/00 428/36.92 |
| 2011/0172335 A1* | 7/2011 | Deshpande .......... C08K 5/3417 524/94 |
| 2013/0029068 A1 | 1/2013 | Treece et al. |

FOREIGN PATENT DOCUMENTS

| | | |
|---|---|---|
| EP | 0822213 A1 | 2/1998 |
| JP | S5282995 A | 7/1977 |
| JP | H11235750 | 8/1999 |
| WO | 1996/033062 | 10/1996 |

* cited by examiner

*Primary Examiner* — Nahida Sultana
(74) *Attorney, Agent, or Firm* — Eric J. Sosenko; Jonathan P. O'Brien; Honigman Miller Schwartz and Cohn LLP

(57) ABSTRACT

A polyester resin for use in a process in which, during an expansion step, an incompressible fluid is injected through an opening of a preform, formed of the polyester resin, to form a container. The polyester resin includes a crystallizable polyester polymer wherein the polyester polymer is comprised of acid moieties and glycol moieties, with at least 85% of the total moles of acid moieties being terephthalate derived from terephthalic acid or its dimethyl ester and at least 85% of the total moles of glycol moieties derived from ethylene glycol. At least 2% of the total moles of acid plus glycol moieties are derived from a primary comonomer with the mole percents of the acid plus glycol moieties totaling 100 mole %.

14 Claims, 5 Drawing Sheets

HIGHLY MODIFIED POLYESTERS FOR CONTAINERS

CROSS REFERENCES AND PRIOR APPLICATIONS

This application is the U.S. national phase of PCT Application No. PCT/US2014/053468 filed on Aug. 29, 2014 and claims priority to U.S. Application No. 61/872,233 filed on Aug. 30, 2013, the disclosures of which are incorporated in their entirety by reference herein.

BACKGROUND

It is known in the art to make bottles from polyester using an injection blow process wherein the polyester is injection molded into a preform and then either heating the preform or cooling the preform to a temperature above the glass transition temperature of the polyester and within the softening temperatures. Once in this deformable temperature region, pressurized air is applied to the preform and the preform expands into the molded shape of the bottle.

U.S. Pat. No. 7,141,190 discloses that use of a liquid rather than heated air can be used, providing a washing or cleansing of acetaldehydes.

The text and granted claims of U.S. Pat. No. 7,141,190 are as follows:

U.S. Pat. No. 7,141,190 claims

1. A process of forming a container from thermoplastic material including the steps of supplying a preform for said container, placing said preform within a cavity of a mold, and expanding said preform for forming said container, characterized by the step of introducing liquid under pressure into said preform located within said mold for stretching said preform to assume the shape of the surrounding mold cavity, including a step of heating said mold to approximately the melting point of the thermoplastic material.

2. A process as defined in claim 1 wherein heat is transferred from the mold, through the thermoplastic material into cooler liquid introduced within the container.

3. A process as defined in claim 2 wherein the crystallization of the thermoplastic material can be increased or decreased under controlled conditions.

4. A process as defined in claim 3 including a step of introducing a sterilization product into said liquid.

5. A process as defined in claim 2 including a step of preheating the liquid to approximately 85 degrees C., prior to introducing said liquid into said preform.

6. A process as defined in claim 1 including a step of introducing dry, sterilized air into said container for venting and drying said container.

7. A process or forming a container from thermoplastic material including the steps of supplying a preform for said container, placing said preform within a cavity of a mold, and expanding said preform for forming said container, characterized by the step of introducing liquid under pressure into said preform located within said mold for stretching said preform to assume the shape of the surrounding mold cavity, including a step of introducing a sterilization product into said liquid.

8. A process as defined in claim 7 wherein said sterilization product is a peroxide.

9. A process as defined in claim 7 including the step of filling said container with product upon completion of forming said container.

10. A process as defined in claim 7 including a step of introducing dry, sterilized air into said container for venting and drying said container.

11. A process of forming a container from thermoplastic material including the steps of supplying a preform for said container, placing said preform within a cavity of a mold, and expanding said preform for forming said container, characterized by the step of introducing liquid under pressure into said preform located within said mold for stretching said preform to assume the shape of the surrounding mold cavity, including a step of heating said thermoplastic material to a temperature close to its melting point, and introducing treated liquid into said preform.

12. A process as defined in claim 11 including a step of treating said liquid by including a peroxide.

13. A process as defined in claim 12 including a step of mixing said peroxide with water for forming said liquid.

14. A process as defined in claim 11 wherein said liquid cleanses said preform of acetaldehydes and ethanol.

U.S. Pat. No. 7,141,190 teaches in its background section that:

Plastic forming of hollow bodies has heretofore encompassed a wide variety of processes and techniques including but not limited to blow molding, stretch-blow molding, thermoforming and the like. For example, hollow bodies having threaded necks are produced from injection-molded preforms which are heated and then expanded by high pressure air through a process called blow molding. At times the preform is allowed to cool down prior to arrival at the blow molding station from the injection molding station and then it must be thermally conditioned within a relatively narrow tolerance to a temperature that is suitable for a subsequent stretching process. In order to obtain uniform and good orientation, the temperature variation across the wall of the body should be within 10 degrees Celsius and not much above 10 degrees Celsius from the glass transition temperature of the plastic to be stretch-blown during the forming process. The closer the temperature is to the glass transition temperature, the more orientation is obtained. However, much higher pressure is required to stretch and blow the container at the lower temperature; therefor, a compromise has to be made. The oriented hollow bodies thus obtained exhibit a mechanical strength which is markedly improved to the point that the bodies can generally be used for packaging carbonated beverages under pressure. The air pressure used in this known process for stretch-blow molding can exceed 1,000 pounds per square inch (psi) if a particular bottom design is required for such containers. Other features, such as molded-in impressions, horizontal rings to resist buckling of the container, and vertical lines to improve stackability all require even higher air pressure during the forming process.

Heat-setting of polyethylene terephthalate (PET) bottles, or other shapes of containers, by stretch-blowing the preforms in a high temperature mold is presently used to crystallize the PET. This process is complicated and requires long cycle times. The container is first heated and then cooled by the mold. Therefore, the larger the change in temperature, in order to speed the crystallization, the more energy is consumed during the process, and compromises must be made between the energy use and the speed of the process.

Also, it is known in the prior art that the containers, such as plastic bottles used for beverages, and containers for food products and the like for human or animal consumption, need to be sterilized to avoid contamination of the food, beverages and the like. Heretofore, this sterilization process required an additional process step following completion of the container forming and following the step of exhausting the pressurized air used during the blow molding process.

Another shortcoming of the prior art is that during the extrusion of the plastic material and the shaping of the preform, formation of acetaldehydes, or ethanol, occurs. These products are toxic in nature and can remain in the container body following the use of pressurized air during the blow molding process.

U.S. Pat. No. 7,141,190 summarizes its invention as

The present invention utilizes liquids instead of air or other gases for the forming process. Liquids are not compressible in a molding environment; therefore; liquids require less energy to transfer a load, and at the same time liquids are excellent heat transfer media. Because the invention is particularly useful for forming containers to be used in the food and beverage field, the present invention is particularly adaptable to the use of water as the hydraulic media. Water is an excellent hydraulic and heat transfer media, economic, readily available, non-toxic, non-hazardous, and subject to easy handling.

Another advantage of using liquids is the avoidance of introducing oxygen into the body of plastic material such as occurs in the prior art in which air is used as the pressure medium. Oxygen has a deleterious effect on many products by reducing shelf-life and causing deterioration of quality. Use of water or other liquids as the pressure medium avoids or minimizes this problem.

The present invention [of U.S. Pat. No. 7,141,190] is useful for forming hollow bodies in the form of containers, or bottles, for liquids such as beverages and the like, and also useful for containing solid products such as granular materials, powders, and materials such as pastes, waxes, depending upon the size and shape of the container and the container opening used to fill and empty product to and from the container.

The present invention [of U.S. Pat. No. 7,141,190] relies upon the use of hydraulic media, such as water, rather than upon pneumatic media such as air that has been used in the past. The work required to create 1,000 psi air pressure is one order of magnitude higher than the work required to create 1,000 psi hydraulic pressure. The equipment to perform the work is proportionate in cost. Both the capital equipment cost and the energy cost constitute a significant portion of the total cost of producing the bottle or other form of container. Because the cost to create high pressure by hydraulic means is not expensive, then it is feasible to stretch thermoplastic preforms at lower temperatures that are closer to the glass-transition of the material. This improved process results in better molecular orientation and improved properties leading to the production of lighter weight containers using less material.

In accordance with the present invention [of U.S. Pat. No. 7,141,190] sterilization of the containers does not require a separate process step, as is required by the prior art. The hot liquid used for forming the container aids somewhat in sterilization while the container is being formed. Sterilization can be assured by introducing sterilization products into the hot water, or other liquid so that the container is sterile upon completion of the stretch molding step ready to receive product upon being emptied of the liquid used during the forming step. Dry sterile air may be used to vent and dry the container, if needed, following the forming step.

A further feature of the present invention [of U.S. Pat. No. 7,141,190] is that by the use of liquid during the expansion of the preform into the desired container shape, the liquid has a washing or cleansing effect to remove some or all of the acetaldehydes or ethanol that was formed during the process of extruding the preform.

[U.S. Pat. No. 7,141,190] describes its invention as:

The invention [of U.S. Pat. No. 7,141,190] is particularly adaptable to the production of polyethylene terephthalate (PET) containers, such as bottles and the like. The novel process can be adapted to the present manufacturing process with minor but important changes. Instead of using hot, pressurized air to blow the preform, tempered water, at approximately 85 degrees Celsius, is pumped into the preform and then pressurized. When the water pressure reaches the desired value and the preform has expanded or stretched to form the desired container shape, the hot water is vented and cooler water is pumped into the bottle, or other form of container, to replace the hot water that can then be stored and used for the next cycle. It is contemplated that the water, or other liquid used during the forming or expansion process can be supplemented by products utilized for sterilization. It is presently preferred that the forming liquid be laced with, for example, peroxide(s) or acetic acid, or other products that are approved by the Food and Drug Administration (FDA). Following the forming step, the bottle or other container then may, but not necessarily, be inverted and sterile, dry air is blown into the bottle to efficiently empty any remaining water, thus leaving the container in a sterile condition and ready for immediate filling with product without requiring the additional sterilization process heretofore needed by the prior art of blow molding with pressurized air. Thus, the containers formed with the present invention can be immediately filled with sterile products, or food or beverages for human consumption.

In those instances in which heat setting is required to make the containers suitable for heat processing of product contained therein, the mold should have the capability to be heated close to the melting point of the thermoplastic material. This could be accomplished, for example, by rf-heating or induction heating. It would be unnecessary to have a cooling arrangement because the required cooling would be achieved by the internal liquid which, as pointed out above, may be at approximately 85 degrees Celsius and, therefor, below the melting point of the plastic used to form the container.

United States Patent Application No. 20050206045 discloses the use of an incompressible fluid and not a gaseous fluid such as air is injected to the opening in the preform.

The claims of United States Patent Application No. 2005060245 are to

1. Process for the production of a polyester resin container from a preform (10) substantially in the form of a cylindrical tube having an opening (10'), preferably at a neck (11), said process comprising a step of heating said preform (10) to a temperature higher than the vitreous transition temperature of said polyester and a step of expansion carried out within a cavity (101), characterized in that, during said expansion step, an incompressible fluid is injected through the opening (10') of said preform (10) to form said container.

2. Process according to claim 1, characterized in that said incompressible fluid is a liquid injected under pressure with a controlled speed and pressure.

3. Process according to claim 1, characterized in that the injected liquid corresponds to the liquid adapted to be contained in the container.

4. Process according to claim 1, characterized in that said container to be formed is a PET bottle, and said preform (10) is heated to a temperature higher than the vitreous transformation temperature of said PET, typically to about 75° C. to 85° C., during said heating step and the temperature of said incompressible fluid is comprised between 10° C. and 90° C. during said expansion step.

5. Process according to claim 4, characterized in that said temperature of the incompressible fluid is about 15° C.

6. Process according to claim 1, characterized in that the injection time of the incompressible fluid is substantially less than one second, preferably comprised between 0.02 second and 0.05 second and more preferably between 0.5 second and 0.2 second.

7. Device (1) to practice the process according to claim 1, characterized in that it comprises essentially a liquid injection means adapted to be connected to a nozzle (102) of a blowing-drawing installation of conventional type with expansion by gaseous fluid.

8. Device (1) according to claim 7, characterized in that a control means (203, 204) of said liquid injection means is actuated by gas under pressure delivered by a gaseous fluid supply line (110) of said blowing-drawing installation of conventional type.

9. Device (1) according to claim 7, characterized in that said liquid injection means is also connected to an inlet (300) of a liquid supply line, preferably a liquid for filling the containers to be formed.

10. Device (1) according to claim 7, characterized in that the injection means consists of a cylinder/piston assembly in which the piston (203, 204) forming control means with alternate movement, delimits in said cylinder, on the one hand, a control chamber (200') connected to a supply line (110) of air under pressure and, on the other hand, a liquid injection chamber (200") connected to an outlet (300) of a liquid supply line and connected to the nozzle (102).

United States Patent Application No. 20050206045 describes its invention as:

The present invention [of United States Patent Application No. 20050206045] relates to the field of production of containers of polymeric material, particularly of polyester. More particularly, it relates to the field of production of polyester bottles, preferably of polyethylene terephthalate (PET), containing a liquid, preferably water and especially mineral water.

The present invention [of United States Patent Application No. 20050206045] has for its object a process for the production of a container of polyester by injection of liquid into a preform. It also has for its object a device for practicing this process.

For many years, PET bottles that are conventionally found in commerce are produced by blowing or blow-drawing, with compressed air, from PET preforms.

A preform is usually in the form of a cylindrical tube closed at one of its ends and open at its opposite end. The head of the preform, which is open, corresponds to the neck of the container. In the course of the conventional procedure for production of a container from a preform, the preforms are threaded, head to bottom, on cylindrical lugs of a continuous conveyor chain which thus transports the preforms through an oven, essentially constituted by a rectilinear section bordered on each side by radiation heating means, so as to raise the temperature of the plastic material for the subsequent step of blow-drawing.

The hot preform is then removed and transported to a mould of a blowing machine. The transport movement is carried out by a transfer arm for example, and is coordinated with that of the blowing machine which is generally in the form of a rotatable carousel turning continuously about its vertical axis and which carries, at its periphery, a series of identical moulds. Thus, the preform is disposed in the mould immediately after this is opened and the previous form content has been removed.

The preform is first heated so as to be in the mould at a temperature higher than the vitreous transition temperature (about 100° C.) so as to permit the shaping by blow-drawing. The temperature of the preform at the end of the heating step is slightly greater than that within the blow mould, so as to take account of the cooling which takes place over the distance existing between the heating place and the blowing place. Thanks to a rotating movement and the simultaneous presence of several moulds, such a blowing machine permits producing containers at a very high rate, of the order of several dozens of thousands of units per hour, namely of the order of 1000 to 2000 bottles per hour and per mould.

The blow-drawing takes place by drawing with the help of a metallic rod, air injection taking place at pressures varying from 3 to 40 bars ($3.10^5$ Pa to $4.10^6$ Pa). The air is injected through a nozzle whose end is introduced through the opening of the head of the preform.

The bottles produced by air injection under pressure have a relatively satisfactory lifetime for a given weight and type of material. Nevertheless, the intrinsic characteristics and properties of PET can envisage even better results by modifying the production process of the containers.

One of the objects of the present invention [of United States Patent Application No. 20050206045] is as a result to provide an improved process for the production of a polyester container from the preform.

Another object is to be able if desired to integrated the step of filling the container with the process of producing this latter.

To this end, the invention [of United States Patent Application No. 20050206045] provides a process for the production of a polyester resin container from a preform present substantially in the form of a cylindrical tube, comprising an opening, preferably at the level of a neck, said process comprising a step of heating said preform to a temperature higher than the vitreous transition temperature of said polyester and a step of expansion carried out within a cavity or a mould, characterized in that, during said expansion step, an incompressible fluid is injected through the opening of said preform to form said container.

The containers obtained by this process have much better characteristics than those obtained by a blowing-drawing process of conventional type with expansion by gaseous fluid. Particularly, it has been determined that they have a longer lifetime for a given weight and type of material. The amount of crystallinity, which is to say the mass of crystalline phase relative to the total mass of polymer, of a container obtained with the process according to the invention, can be in particular much greater.

For example, in the case of PET bottles, the bottles obtained by the process according to the invention can have crystallinity comprised between 30% and 50%, which gives them greater lifetimes than bottles obtained at present for a same weight and type of PET having crystallinity comprised between 25% and 30%.

According to another aspect of the present invention [of United States Patent Application No. 20050206045], said incompressible fluid is a liquid injected under pressure, at a controlled speed and pressure, in a controlled quantity, preferably the liquid adapted to be contained in said final container to be formed.

Thus, the liquid used for the production of the contents can be the liquid to be packaged, for example water and particularly mineral water, which permits passing to a last filling step. The steps of production of containers and filling of these containers are thus integrated into a single and same step. This solution obviously provides important economic advantages and limits the risk of contamination, in particular bacterial, of the empty container.

Preferably, when said container to be formed is a PET bottle, said preform is heated to a temperature higher than the vitreous transition temperature of said PET, typically about 75° C. to 85° C., during said heating step, and the temperature of said incompressible fluid is comprised between 10° C. and 90° C. during said expansion step.

According to a preferred embodiment of the invention, said temperature of the incompressible fluid is about 15° C.

According to another aspect of the present invention, there is also provided a device to practice a process of the type which has been defined, characterized in that it comprises essentially injection means of liquid adapted to be connected to a nozzle of a known blowing or drawing installation, particularly of the conventional type with expansion by gaseous fluid.

Thus, the process according to the invention can particularly be used with an installation for the production of containers that already exist, for example a unit for the production of PET bottles of the conventional type. It suffices to modify the installation such that the blowing nozzles which are associated with the different moulds of the conventional blowing machine would be connected to means for injection of liquid according to the invention instead of gaseous fluid.

However, the process according to the invention could equally be used with a specific installation constructed for this purpose and having different elements described above.

Preferably, a control means of said liquid injection means is actuated by gas under pressure delivered by a supply line of gaseous fluid of said blowing installation or blowing-drawing installation of conventional type.

It can comprise for example a piston whose movement in a jack filled with liquid is controlled by the gaseous fluid under pressure of a blowing or blow drawing installation of conventional type. Similarly, the gaseous fluid inlets of an installation for production of containers, that already exists, for example a unit for production of PET bottles of the conventional type, is used to control the associated liquid injection means according to the invention. The conventional blowing installation thus needs overall very little modification.

Preferably, said liquid injection means is also connected to the input of a liquid supply line, preferably the liquid for filling the containers to be formed.

Similarly, as has been explained above, the liquid used for the production of the containers is the liquid to be packaged, which permits omitting a supplemental filling device.

The devices for production of containers and filling these containers are thus integrated in a single and same device.

Thus, according to a preferred embodiment [of United States Patent Application No. 20050206045], the injection means consists of a cylinder/piston assembly, in which the piston forming the control means with alternate movement delimits in said cylinder, on the one hand, a control chamber connected to a supply line of air under pressure, and, on the other hand, an injection chamber for liquid connected to the input of a liquid supply line and connected to the nozzle.

The invention [of United States Patent Application No. 20050206045] will be better understood from the description which follows, which relates to a preferred embodiment, given by way of non-limiting example, and explained with reference to the accompanying schematic drawing showing a device 1 for injection of liquid into a preform installed in a mould or a cavity, according to the present invention.

The embodiment described here [of United States Patent Application No. 20050206045] by way of example relates to a process for the production of water bottles of PET from a heated preform. Thus, as is seen in the accompanying drawing, a preform 10 is present in the form a cylindrical tube closed at its lower end. The head 11 of the preform, which is open, corresponds to the neck of the bottle, which is to say, in this case, to the throat on which will be screwed a cap.

The process is practiced by means of modifications of a conventional installation for producing PET mineral water bottles of PET, such as described above in the introductory portion of the present text.

According to the present invention, during the expansion step, there is injected through the opening 10' of the preform 10, not air under pressure, but an incompressible fluid. There will preferably be used as incompressible fluid permitting the forming of the bottle, the liquid that this bottle will contain, so as to omit a later filling step.

So as to practice the invention, modifications are made to a conventional installation for production of PET bottles, as will be seen on the accompanying drawing.

Overall, there are connected to the blowing machine, at the level of the moulds, devices 1 for the injection of liquid, adapted to be connected to nozzles 102 associated with these moulds (one device 1 per mould).

The single figure [of United States Patent Application No. 20050206045] shows in a schematic manner a mould 101 within which is enclosed the body of a preform 10. The neck 11 of the preform extends outside the mould. The blowing nozzle 102 associated with the mould is inserted through the opening 10' of the neck 11 of the preform 10.

The blowing nozzle 102 is normally connected to an air supply 110. According to the present invention, the direct connection between the air supply 110 and the nozzle 102 is disassembled. On the contrary, a device 1 for injection of liquid constituted essentially by a jack 200 is associated with the mould 101.

The cylinder/piston assembly or jack 200 comprises a cylinder body adapted to enclose hermetically both a liquid and a gas and a piston 203, 204 adapted to slide longitudinally in the body of the jack. The head 204 of the piston separates the body of the jack 200 into two compartments 200' and 200'' (or chambers) hermetically sealed separated from each other, an upper compartment 200' adapted to receive air and a lower compartment 200'' adapted to receive water. The upper portion 205 of the jack comprises an air inlet 206 and a lower portion 201 of the jack comprises a water inlet 202 and a water outlet 210.

The air inlet 206 is connected to the air supply 110 by means of a valve 111. The water inlet 202 is associated with a water supply system comprising a water supply 300 connected by means of a valve 301 to the water inlet 202 at the level of which a purge conduit is also provided, controlled by a valve 302. Preferably, according to the invention, the water supply system supplies mineral water adapted to be contained in the bottles. The water outlet 210 is connected to the nozzle 102 such that this latter will be supplied by the device 1 for injection of water 200.

Magnetic detectors 207 and 208 (forming position or level detectors) are installed on a jack 200 at different heights, the detector 207 acting in a lower portion 201 of the jack and the detector 208 acting in an upper portion 205 of the jack.

The valves 111, 209, 301 and 302 are controlled by control servo mechanisms directed by a central control system or automaton (not shown) of the installation for production of bottles, such that the operation of the device 1 for injection of water will be coordinated with the operation of the forming (blowing) machine and, more generally with the operation of the assembly of the installation for the production of bottles.

The operation of the water injection device 1, coordinated with the operation of the forming or blowing machine, is effected according to an injection cycle of a duration less than the duration of the rotation cycle of a mould about the axis of the forming machine.

In a first step of the injection cycle, the valve 300 is open to fill the lower portion of the jack with water until the piston head 204 is located at the level of the magnetic detector 208. When the magnetic detector 208 detects the piston head 204, the second step consisting in closing the valve 301 is executed. In a third step of the injection cycle, the valve 111 is opened so as to place the upper portion of the jack under pressure. This step is executed during a given time fixed by a timer. At the end of this step, a fourth step is executed during which the valve 209 is open. The piston 203, 204, actuated by air under pressure present in its upper portion 205, will then descend, giving rise to the injection of water through the valve 209 into the nozzle 102 and then into the preform 10 which is simultaneously stretched and inflated by the water injected until its [sic it] reaches the walls 103 of the mold 101. The bottle is thus formed which, moreover, is already filled with water. This step is interrupted when the magnetic detector 207 detects the presence of the piston head 203. After a given time fixed by a timer, the valves 209 and 111 are closed. When, at the end of the rotation cycle of the mould about the axis of the blowing machine, this mould automatically opens, the bottle transfer arm removes the bottle formed and already filled.

The optimization of the process takes place for a predetermined drawing quantity, a preform temperature higher than the vitreous transition temperature of the polyester used, and a rapid speed of injection, greater than that of the cooling of the material used. Thus, another advantage is a very short cycle time, the injection time of the incompressible fluid being substantially less than one second, preferably comprised between 0.02 second and 0.5 second and more preferably between 0.1 second and 0.2 second.

So as to eliminate air bubbles that may be contained in the circuit, there is also provided a purge cycle. The starting cycle is defined by the automaton.

In a first step of the purge cycle, the valve 301 is open to fill the lower portion 201 of the jack with water until the piston head 204 is located at the level of the magnetic detector 208. When the magnetic detector 208 detects the piston head 204, the second step consisting in closing the valve 301 takes place. In a third step of the injection cycle, the valve 111 is open so as to place the upper portion of the jack under pressure. This step is executed for a given time fixed by a timer. At the end of this step, a fourth step is executed during which the purge valve 302 is open. The piston 203, 204, actuated by air under pressure present in the upper portion 205, will thus descend, giving rise to the injection of water through the valve 302. This step is interrupted when the magnetic detector 207 detects the presence of the piston head 203. After a given time fixed by a timer, the valves 302 and 111 are closed.

The temperature of the water can be comprised between 10° C. and 90° C. according to technical constraints imposed by the bottle that it is desired to produce. It is necessarily particularly that the pressure be sufficiently great to deform the preform and the lower temperatures require higher pressures. However, when the technical constraints permit, the temperature of the liquid will preferably be 15° C.

Preferably so that the neck 11 of the preform 10 does not risk being deformed during the expansion cycle, this latter is isolated from the liquid by a sealing and/or cooling member.

The contents obtained by this process have characteristics much better than those obtained with an expansion process of the conventional type carried out with gaseous blowing. Particularly, they have a greater lifetime for a given weight and type of material. The quantity of crystallinity, which is to say the mass of the cystalline [sic crystalline] phase relative to the total mass of the polymer, of a container obtained with the process according to the invention, can particularly be much greater. The use of rapid expansion speeds permits obtaining a fairly high blowing production and an induced crystallinity which is also high.

For example, in the case of tests carried out with water at temperatures between 85° C. and 95° C. and under pressures from 2 bars to 3 bars ($2 \times 10^5$ Pa to $3 \times 10^5$ Pa) in the case of PET containers, the containers obtained by the process according to the invention had levels of crystallinity up to 50%. To reach this quantity, there are integrated all the non-amorphous phases, which is to say the crystalline phase and the mesophase.

WO 2009/075791 discloses using the final liquid product to impart the pressure required to expand a hot preform and to take on the shape of a mold thus simultaneously forming and filling the container.

TECHNICAL FIELD

This disclosure generally relates to an apparatus and method for forming and filling a plastic container. More specifically, this disclosure relates to an apparatus and method for simultaneously forming and filling a plastic container.

BACKGROUND

As a result of environmental and other concerns, plastic containers, more specifically polyester and even more specifically polyethylene terephthalate (PET) containers are now being used more than ever to package numerous commodities previously supplied in glass containers. Manufacturers and fillers, as well as consumers, have recognized that PET containers are lightweight, inexpensive, recyclable and manufacturable in large quantities.

Blow-molded plastic containers have become commonplace in packaging numerous commodities. PET is a crystallizable polymer, meaning that it is available in an amorphous form or a semi-crystalline form. The ability of a PET container to maintain its material integrity relates to the percentage of the PET container in crystalline form, also known as the "crystallinity" of the PET container.

The following equation defines the percentage of crystallinity as a volume fraction:

$$\% \text{ Crystallinity} = \left(\frac{\rho - \rho a}{\rho c - \rho a}\right) \times 100$$

where ρ is the density of the PET material; ρa is the density of pure amorphous PET material (1.333 g/cc); and ρc is the density of pure crystalline material (1.455 g/cc). Once a container has been blown, a commodity may be filled into the container.

Traditionally blow molding and filling have developed as two independent processes, in many cases operated by different companies. In order to make bottle filling more cost effective, some fillers have moved blow molding in house, in many cases integrating blow molders directly into their filling lines. The equipment manufacturers have recognized this advantage and are selling "integrated" systems that are designed to insure that the blow molder and the filler are fully synchronized. Despite the efforts in bringing the two processes closer together, blow molding and filling continue to be two independent, distinct processes. As a result, significant costs may be incurred while performing these two processes separately. Thus, there is a need for a liquid or hydraulic blow molding system suitable for forming and filling a container in a single operation.

SUMMARY WO 2009075791

Accordingly, the present disclosure [of WO 2009075791] provides a system and method for using the final liquid product to impart the pressure required to expand a hot preform and to take on the shape of a mold thus simultaneously forming and filling the container.

In one example, the system [of WO 2009075791] includes a mold cavity defining an internal surface and adapted to accept a preform. The system also includes a pressure source having an inlet, a filling cylinder and a piston-like device. The piston-like device is moveable within the filling cylinder in a first direction such that liquid is drawn into the filling cylinder through the inlet and in a second direction such that the liquid is urged toward the preform. A blow nozzle may be adapted to receive the liquid from the pressure source and transfer the liquid at high pressure into the preform thereby urging the preform to expand toward the internal surface of the mold cavity and create a resultant container. The liquid remains within the container as an end commodity.

Additional benefits and advantages of the present disclosure [of WO 2009075791] will become apparent to those skilled in the art to which the present disclosure relates from the subsequent description and the appended claims, taken in conjunction with the accompanying drawings.

DETAILED DESCRIPTION WO2009075791

The following description [of WO 2009075791] is merely exemplary in nature, and is in no way intended to limit the disclosure or its application or uses.

With reference to all Figures [of WO 2009075791], a mold station according to the present teachings is shown and generally referred to as reference numeral 10. FIGS. 1-7 show one exemplary sequence according to the present teachings. [NOTE: FIGS. 1-7 of the disclosure in WO2009075791 correspond directly with FIGS. 1-7 of this instant specification] As will become appreciated from the following description, the mold station 10 and associated method utilize a final liquid commodity L to impart the pressure required to expand a hot preform 12 to take on the shape of a mold thus simultaneously forming and filling a resultant container C (FIG. 7).

With initial reference to FIGS. 1 and 2, the mold station 10 will be described in greater detail. The mold station 10 generally includes a mold cavity 16, a pressure source 20, a blow nozzle 22 and a stretch rod 26. The exemplary mold cavity 16 illustrated includes mold halves 30, 32 that cooperate to define an interior surface 34 corresponding to a desired outer profile of a blown container. The mold cavity 16 may be moveable from an open position (FIG. 1) to a closed position (FIG. 2) such that a support ring 38 of the preform 12 is captured at an upper end of the mold cavity 16. The preform 12 may be formed of a polyester material, such as polyethylene terephthalate (PET), having a shape well known to those skilled in the art similar to a test-tube with a generally cylindrical cross section and a length typically approximately fifty percent (50%) that of the resultant container C height. The support ring 38 may be used to carry or orient the preform 12 through and at various stages of manufacture. For example, the preform 12 may be carried by the support ring 38, the support ring 38 may be used to aid in positioning the preform 12 in the mold cavity 16, or an end consumer may use the support ring 38 to carry the plastic container C once manufactured.

In one example [of WO 2009075791], the pressure source 20 can be in the form of, but not limited to, a filling cylinder, manifold or chamber 42 that generally includes a mechanical piston-like device 40 including, but not limited to, a piston, a pump (such as a hydraulic pump) or any other such similarly suitable device, moveable within the filling cylinder, manifold or chamber 42. The pressure source 20 has an inlet 46 for accepting the liquid commodity L and an outlet 48 for delivering the liquid commodity L to the blow nozzle 22. It is appreciated that the inlet 46 and the outlet 48 may have valves incorporated thereat. The piston-like device 40 may be moveable in a first direction (upward as viewed in the FIGS.) to draw the liquid commodity L from the inlet 46 into the filling cylinder, manifold or chamber 42, and in a second direction (downward as viewed in the FIGS.) to deliver the liquid commodity L from the filling cylinder, manifold or chamber 42 to the blow nozzle 22. The piston-like device 40 can be moveable by any suitable method such as pneumatically, mechanically or hydraulically for example. The inlet 46 of the pressure source 20 may be connected, such as by tubing or piping to a reservoir or container (not shown) which contains the final liquid commodity L. It is appreciated that the pressure source 20 may be configured differently.

The blow nozzle 22 [of WO 2009075791] generally defines an inlet 50 for accepting the liquid commodity L from the outlet 48 of the pressure source 20 and an outlet 56 (FIG. 1) for delivering the liquid commodity L into the preform 12. It is appreciated that the outlet 56 may define a shape complementary to the preform 12 near the support ring 38 such that the blow nozzle 22 may easily mate with the preform 12 during the forming/filling process. In one example, the blow nozzle 22 may define an opening 58 for slidably accepting the stretch rod 26 used to initiate mechanical stretching of the preform 12.

In one example [of WO 2009075791], the liquid commodity L may be introduced into the plastic container C during a thermal process, typically a hot-fill process. For hot-fill bottling applications, bottlers generally fill the plastic container C with a liquid or product at an elevated temperature between approximately 185° F. to 205° F. (approximately 85° C. to 96° C.) and seal the plastic container C with a closure (not illustrated) before cooling. In one configuration, the liquid may be continuously circulated within the filling cylinder, manifold or chamber 42 through the inlet 46 whereby the liquid can be heated to a preset temperature (i.e., at a heat source (not illustrated) upstream of the inlet 46). In addition, the plastic container C may be suitable for other high-temperature pasteurization or retort filling processes, or other thermal processes as well. In another example, the liquid commodity L may be introduced into the plastic container C under ambient or cold temperatures. Accordingly, by way of example, the plastic container C may be filled at ambient or cold temperatures such as between approximately 32° F. to 90° F. (approximately 0° C. to 32° C.), and more preferably at approximately 40° F. (approximately 4.4° C.). In examples where the liquid commodity is filled at ambient or cold temperatures, the preform may be subjected to a sterilization process before introducing the liquid commodity as will be described herein.

With reference now to all Figures [of WO 2009075791], an exemplary method of simultaneously forming and filling the plastic container C will be described. According to one example (FIG. 1), steam S may be directed onto and/or into the preform 12 to partially or completely sterilize the preform 12. By subjecting the preform 12 to a sterilizing technique (such as steam S), an aseptic preform and resulting container can be created without requiring the end liquid to be the sterilizing medium. Therefore, the container need not be formed by a hot-filling process. It is appreciated that while steam S is shown in FIG. 1, other sterilizing mediums and/or techniques may be employed. In one example, the sterilizing medium may be a liquid such as, but not limited to, liquid peroxide.

The preform 12 [of WO 2009075791] may be placed into the mold cavity 16 (FIG. 2). In one example, a machine (not illustrated) places the preform 12 heated to a temperature between approximately 190° F. to 250° F. (approximately 88° C. to 121° C.) into the mold cavity 16. As the preform 12 is located into the mold cavity 16, the piston-like device 40 of the pressure source 20 may begin to draw the liquid commodity L into the filling cylinder, manifold or chamber 42 through the inlet 46. The mold halves 30, 32 of the mold cavity 16 may then close thereby capturing the preform 12 (FIG. 2). The blow nozzle 22 may form a seal at a finish of the preform 12. The mold cavity 16 may be heated to a temperature between approximately 250° F. to 350° F. (approximately 93° C. to 177° C.) in order to impart increased crystallinity levels within the resultant container C. In another example, the mold cavity 16 may be provided at ambient or cold temperatures between approximately 32° F. to 90° F. (approximately 0° C. to 32° C.). The liquid commodity L may continue to be drawn into the filling cylinder, manifold or chamber 42 by the piston-like device 40.

Turning now to FIG. 3 [of WO 2009075791], the stretch rod 26 may extend into the preform 12 to initiate mechanical stretching. At this point, the liquid commodity L may continue to be drawn into the filling cylinder, manifold or chamber 42. With reference to FIG. 4, the stretch rod 26 continues to stretch the preform 12 thereby thinning the sidewalls of the preform 12. The volume of the liquid commodity L in the filling cylinder, manifold or chamber 42 may increase until an appropriate volume suitable to form and fill the resultant container C is reached. At this point, a valve disposed at the inlet 46 of the pressure source 20 may be closed.

With specific reference to FIG. 5 [of WO 2009075791], the piston-like device 40 may then begin to drive downward (drive phase) to initiate the rapid transfer of the liquid commodity L from the filling cylinder, manifold or chamber 42 to the preform 12. Again, the piston-like device 40 may be actuated by any suitable means such as pneumatic, mechanical and/or hydraulic pressure. In one example, the hydraulic pressure within the preform 12 may reach between approximately 100 PSI to 600 PSI. The liquid commodity L causes the preform 12 to expand toward the interior surface 34 of the mold cavity 16. Residual air may be vented through a passage 70 defined in the stretch rod 26 (FIG. 5). As shown in FIG. 6, the piston-like device 40 has completed its drive phase thereby completely transferring the appropriate volume of the liquid commodity L to the newly formed plastic container C. Next, the stretch rod 26 may be withdrawn from the mold cavity 16 while continuing to vent residual air. The stretch rod 26 may be designed to displace a predetermined volume of the liquid commodity L when it is withdrawn from the mold cavity 16 thereby allowing for the desired fill level of the liquid commodity L within the resultant plastic container C. Generally, the desired fill level will correspond at or near the level of the support ring 38 of the plastic container C.

Alternatively, the liquid commodity L [of WO 2009075791] can be provided at a constant pressure or at different pressures during the molding cycle. For example, during axial stretching of the preform 12, the liquid commodity L may be provided at a pressure which is less than the pressure applied when the preform 12 is blown into substantial conformity with the interior surface 34 of the mold cavity 16 defining the final configuration of the plastic container C. This lower pressure $P_1$ may be ambient or greater than ambient but less than a subsequent high pressure $P_2$. The preform 12 is axially stretched in the mold cavity 16 to a length approximating the final length of the resultant plastic container C. During or just after stretching the preform 12, the preform 12 is generally expanded radially outward under the low pressure $P_1$. This low pressure $P_1$ is preferably in the range of between approximately 100 PSI to 150 PSI. Subsequently, the preform 12 is further expanded under the high pressure $P_2$ such that the preform 12 contacts the interior surface 34 of the mold halves 30, 32 thereby forming the resultant plastic container C. Preferably, the high pressure $P_2$ is in the range of approximately 500 PSI to 600 PSI. As a result of the above method, the base and contact ring of the resultant plastic container C is fully circumferentially formed.

Optionally, more than one piston-like device may be employed during the formation of the resultant plastic container C. For example, a primary piston-like device may be used to generate the low pressure $P_1$ to initially expand the preform 12 while a secondary piston-like device may be used to generate the subsequent high pressure $P_2$ to further expand the preform 12 such that the preform 12 contacts the interior surface 34 of the mold halves 30, 32 thereby forming the resultant plastic container C.

With reference to FIG. 7 [of WO 2009075791], the fill cycle is shown completed. The mold halves 30, 32 may separate and the blow nozzle 22 may be withdrawn. The resultant filled plastic container C is now ready for post-forming steps such as capping, labeling and packing. At this point, the piston-like device 40 may begin the next cycle by drawing the liquid commodity L through the inlet 46 of the pressure source 20 in preparation for the next fill/form cycle. While not specifically shown, it is appreciated that the mold station 10 may include a controller for communicating signals to the various components. In this way, components such as, but not limited to, the mold cavity 16, the blow nozzle 22, the stretch rod 26, the piston-like device 40 and various valves may operate according to a signal communicated by the controller. It is also contemplated that the controller may be utilized to adjust various parameters associated with these components according to a given application.

Some additional advantages [of WO 2009075791] realized by the present teachings will now be discussed further.

According to one advantage [of WO 2009075791], some of the processing parameters can be lowered while still reaching desired results. For example, the requirements for preform conditioning can be reduced because the crystallinity requirements can be lowered. In addition, mold conditioning requirements can be reduced which can reduce the amount of oils and/or other surface preparation materials used on the interior surface 34 of the mold cavity 16.

According to one example [of WO 2009075791], the integrated blowing and filling process described herein can be used to form containers having carbonated beverages (i.e., soda, etc.). In such an example, liquid carbon dioxide can be used in solution as part of, or in addition to, the liquid commodity during the simultaneous blowing and filling process. Liquid carbon dioxide prevents foaming that could otherwise occur when blowing with a liquid commodity having gaseous carbon dioxide. Carbon dioxide may exist in liquid form at a given pressure and temperature.

The combination of both the blow and filling processes [of WO 2009075791] into one piece of equipment (mold station 10) may reduce handling parts and therefore lead to reduced capital cost per resultant plastic container C. In addition, the space required by a process that simultaneously blows and fills the resultant plastic container C may be significantly reduced over the space required when the processes are separate. This may also result in lower infrastructure cost.

Integrating the two processes [of WO 2009075791] into a single step may reduce labor and additional costs (both capital and expense) associated with handling bottles after they are produced and before they are filled.

Integrating the blowing and filling processes into a single process [of WO 2009075791] eliminates the need to ship bottles. The shipping of bottles is inherently inefficient and expensive. Shipping preforms, on the other hand, is much more efficient. In one example, a trailer load of empty 500 ml water bottles contains approximately 100,000 individual bottles. The same size trailer loaded with preforms required to make 500 ml water bottles will carry approximately 1,000,000 individual preforms, a 10:1 improvement.

Compressed air is a notoriously inefficient means of transferring energy. Using the final product to provide hydraulic pressure to blow the container will require the equivalent of a positive displacement pump. As a result, it is a much more efficient way to transfer energy.

In the exemplary method described herein [of WO 2009075791], the preforms may be passed through an oven in excess of 212° F. (100° C.) and immediately filled and capped. In this way, the opportunity for an empty container to be exposed to the environment where it might become contaminated is greatly reduced. As a result, the cost and complexity of aseptic filling may be greatly reduced.

In some instances where products are hot filled, the package must be designed to accommodate the elevated temperature that it is exposed to during filling and the resultant internal vacuum it is exposed to as a result of the product cooling. A design that accommodates such conditions may require added container weight. Liquid/hydraulic blow molding offers the potential of eliminating the hot fill process and as a result, lowering the package weight.

The process described herein [of WO 2009075791] may eliminate intermediary work in process and therefore may avoid the cost associated with warehousing and/or container silos and/or forklifts and/or product damage, etc. In addition, without work in process inventory, the overall working capital may be reduced.

As blowing and filling are integrated closer but remain as two separate processes (such as conventional methods of forming and subsequently filling), the overall efficiency of such a system is the product of the individual efficiencies of the two parts. The individual efficiencies may be driven largely by the number of transitions as parts move through the machines. Integrating the two processes into one may provide the opportunity to minimize the number of transitions and therefore increase the overall process efficiency.

Many beverages, including juices, teas, beer, etc., are sensitive to oxygen and need to be protected when packaged. Many plastics do not have sufficient barrier characteristics to protect the contents from oxygen during the life of the packaged product. There are a number of techniques used to impart additional barrier properties to the container to slow down oxygen transmission and therefore protect the packaged contents. One of the most common techniques is to use an oxygen scavenger in the container wall. Such a scavenger may be molded directly into the preform. The relatively thick wall of the preform protects the scavenger from being consumed prior to blowing it into a container. However, once the container has been blown, the surface area of the wall increases and the thickness decreases. As such, the path that the oxygen has to travel to contact and react with the active scavenging material is much shorter. Significant consumption of oxygen scavengers may begin as soon as the container is blown. If the container is formed and filled at the same time, then the scavenger is protecting the product through its entire useful life and not being consumed while the container sits empty waiting to be filled.

The method described herein [of WO 2009075791] may be particularly useful for filling applications such as isotonic, juice, tea and other commodities that are susceptible to biological contamination. In particular, by optionally sterilizing the preform as described above, an aseptic preform and resulting container can be created without requiring the end liquid to be the sterilizing medium. These commodities are typically filled in a controlled, sterile environment. Commercially, two ways are typically used to achieve the required sterile environment. In Europe, one primary method for filling these types of beverages is in an aseptic filling environment. The filling operation is performed in a clean room. All of the components of the product including the packaging must be sterilized prior to filling. Once filled, the product may be sealed until it is consumed preventing any potential for the introduction of bacteria. The process is expensive to install and operate. As well as, there is always the risk of a bacterial contaminant breaking through the operational defenses and contaminating the product.

In North America, one predominant method for filling contaminant susceptible beverages is through hot filling. In this process, the beverage is introduced to the container at a temperature that will kill any bacteria that is present. The container may be sealed while the product is hot. One drawback to this technology is that the containers usually need to be heavy to sustain the elevated filling temperature and the vacuum that eventually develops in the container as the product cools. As well as, the blow process is somewhat more complex and therefore more costly than non-heat set blow molding. The disclosure described herein offers the opportunity to dramatically reduce the cost and complexity of filling sensitive foods and beverages. By combining the blowing and filling processes, there is an ability to heat the preform to over 212° F. (100° C.) for a sufficient period of time necessary to kill any biological contaminants. If a sterile product is used as the container-forming medium and then immediately sealed, the process may result in a very inexpensive aseptic filling process with very little opportunity for contamination.

The concurrent blowing and filling process described herein [of WO 2009075791] can also facilitate the formation of a super-lightweight container. As noted above, in traditional hot-fill containers, the container usually needed to have a suitable wall thickness to accommodate vacuum pressures. By sterilizing the preform 12 (i.e. such as by subjecting it to steam S, FIG. 1) prior to introducing the liquid commodity, the resultant wall thickness can be much thinner relative to a traditional hot-filled container. In a super-lightweight container, the liquid itself can give structural support to the container. The walls of a super-lightweight container can therefore be extremely flexible.

There are many other bottled products where this technology may be applicable. Consumable products such as dairy products, liquor, salad dressings, sauces, spreads, ketchups, syrups, edible oils, and others may be bottled utilizing such methods. Furthermore, the term liquid commodity L used herein can also include non-consumable goods such as household cleaners, detergents, personal care items such as toothpaste, etc. Many of these products are currently found in blow molded PET containers but are also in extrusion molded plastic containers, glass bottles and/or cans. This technology has the potential of dramatically changing the economics of package manufacture and filling.

While much of the description has focused on the production of PET containers, it is contemplated that other polyolefin materials (e.g., polyethylene, polypropylene, polyester, etc.) as well as a number of other plastics may be processed using the teachings discussed [in WO 2009075791].

None of these disclosures provide a working example or discuss the attributes of the polyester resin required to utilize this blowing/expansion technique. There exists therefore the need of polyesters having special characteristics to improve upon the techniques described in the prior art.

SUMMARY

This specification discloses an improvement to a process to form a polyester resin container from a preform comprising an opening, preferably at the level of a neck, utilizing a step of expansion carried out with a cavity or a mould, characterized in that, during said expansion step, an incompressible fluid is injected through the opening of said preform to form said container with the improved polyester resin comprising a crystallizable polyester polymer wherein the polyester polymer is comprised of acid moieties and glycol moieties, with at least 85% of the total moles of acid moieties being terephthalate derived from terephthalic acid or its dimethyl ester and at least 85% of the total moles of glycol moieties derived from ethylene glycol and with at least 2% of the total moles of acid plus glycol moieties derived from a primary comonomer with the mole percents of the acid plus glycol moieties totaling 100 mole %.

This specification also discloses an improvement in a process for forming a polyester resin container from a preform, by placing the preform within a cavity of a mold and expanding the preform within the cavity of the mold by introducing a compressible fluid under a blow pressure into the preform located in the mold and stretching the preform to assume the shape of the surrounding mold cavity, with an improved polyester resin comprising a crystallizable polyester polymer wherein the polyester polymer is comprised of acid moieties and glycol moieties, with at least 85% of the total moles of acid moieties being terephthalate derived from terephthalic acid or its dimethyl ester and at least 85% of the total moles of glycol moieties derived from ethylene glycol and with at least 2% of the total moles of acid plus glycol moieties derived from a primary comonomer with the mole percents of the acid plus glycol moieties totaling 100 mole % wherein the blow pressure is at 10% less than the blow pressure used to stretch a reference preform into the same mold cavity, wherein the reference preform is made from a reference polyester.

It is further described that the primary comonomer of either improved process is selected from the group consisting of the aliphatic diacids or their dimethyl esters and that it can be selected from the group consisting of sebacic, adipic acid and their respective dimethyl ester.

The primary comonomer of either improved process may also be present in the range of 1 to 10 mole % of the total acid moieties in the crystallizable polyester and have an intrinsic viscosity in the range of 0.50 to 0.95 dl/g.

It is further disclosed that the crystallizable polyester of either improved process has a melting temperature in the range of 235 to 242° C. and a glass transition temperature in the range of 60° C. to 73° C.

DESCRIPTION

Figure 1:
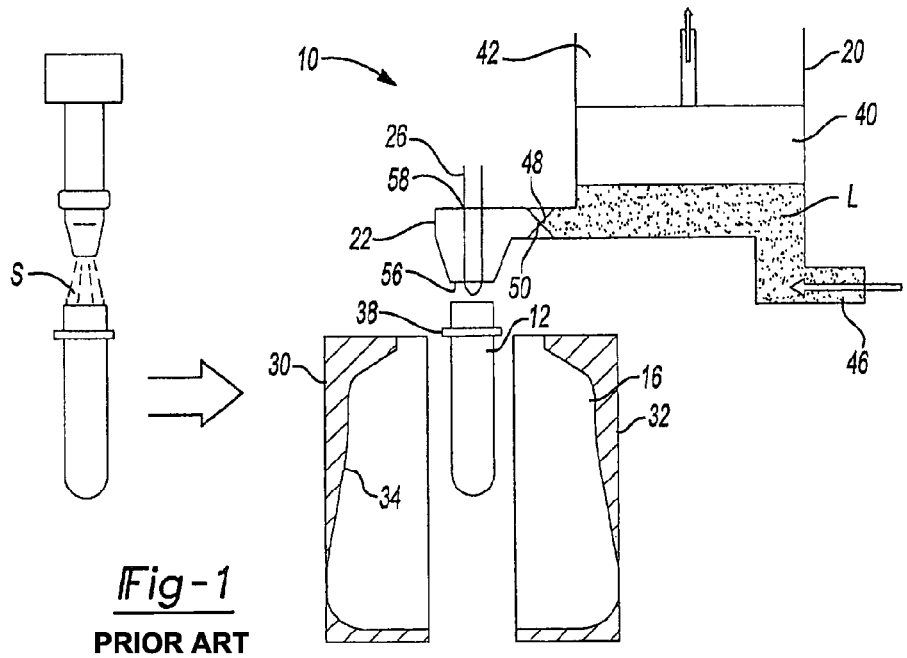
FIG. 1 is a prior art schematic depiction corresponding to FIG. 1 of WO 2009075791 of a heated preform passed into a mold station and being subject to an optional sterilization step, wherein a pressure source including a piston-like device begins to move upward, drawing liquid into the pressure source in accordance with the teachings of WO 2009075791.
Figure 2:
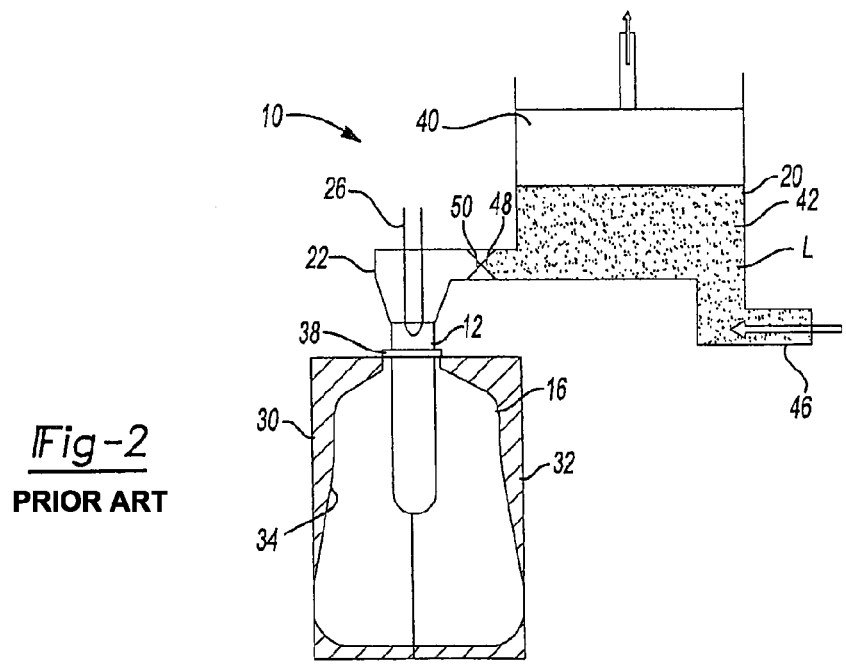
FIG. 2 is a prior art schematic depiction corresponding to FIG. 2 of WO 2009075791 of the system illustrated in FIG. 1 wherein the mold halves close around the preform and liquid continues to accumulate in the pressure source.
Figure 3:
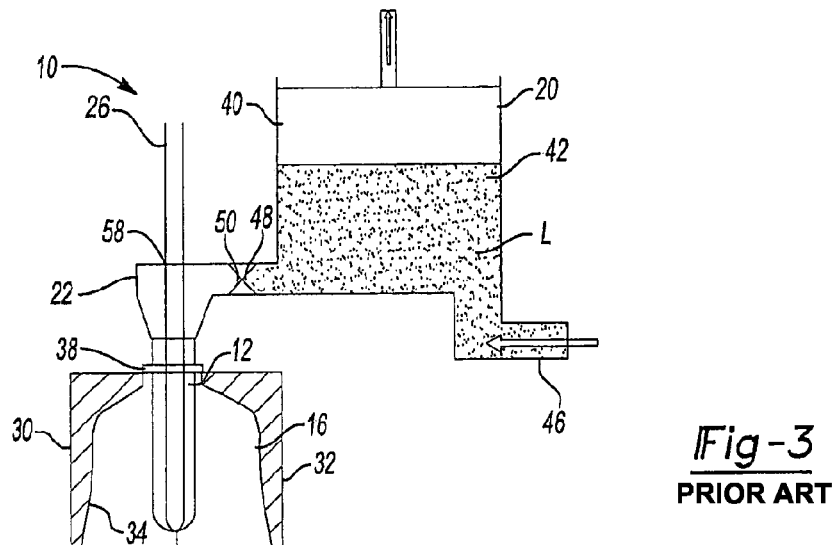
FIG. 3 is a prior art schematic depiction corresponding to FIG. 3 of WO 2009075791 of the system illustrated in FIG. 2 wherein a stretch rod extends into the preform to initiate mechanical stretching and wherein fluid continues to accumulate in the pressure source.
Figure 4:
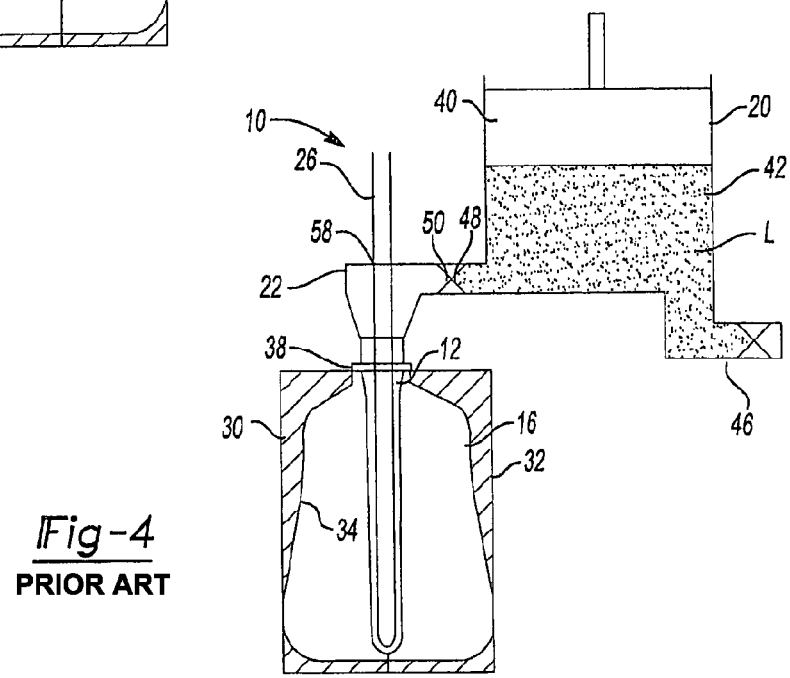
FIG. 4 is a prior art schematic depiction corresponding to FIG. 4 of WO 2009075791 of the system of FIG. 3 wherein the stretch rod stretches the preform and wherein fluid has been fully accumulated in the pressure source.
Figure 5:
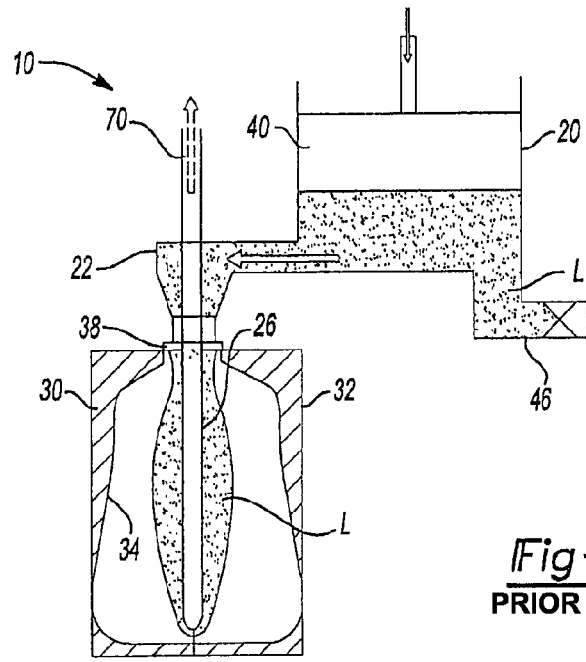
FIG. 5 is a prior art schematic depiction corresponding to FIG. 5 of WO 2009075791 of the system of FIG. 4 wherein the piston-like device drives the liquid from the pressure source to the preform thereby expanding the preform toward the walls of the mold cavity.
Figure 6:
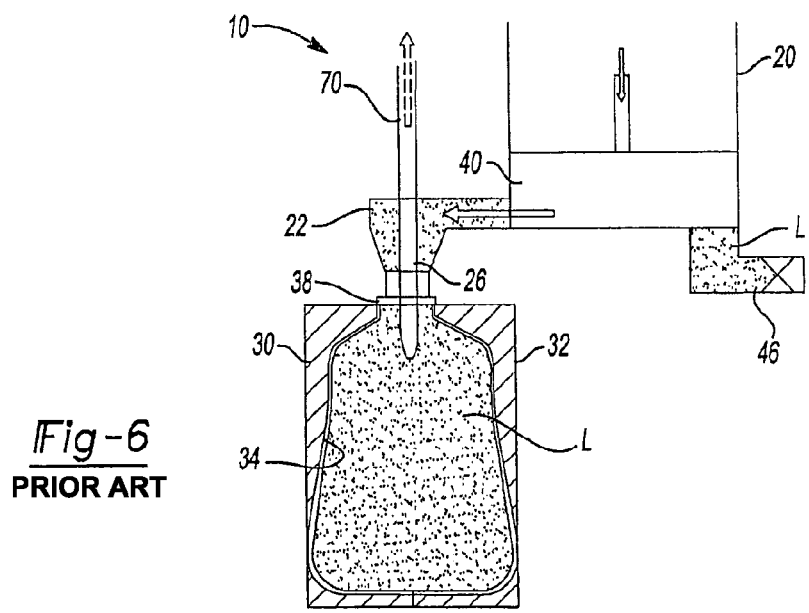
FIG. 6 is a prior art schematic depiction corresponding to FIG. 6 of WO 2009075791 of the system of FIG. 5 wherein the piston-like device has been fully actuated thereby completely transferring an appropriate volume of liquid to the newly formed container and wherein the stretch rod is withdrawing.
Figure 7:
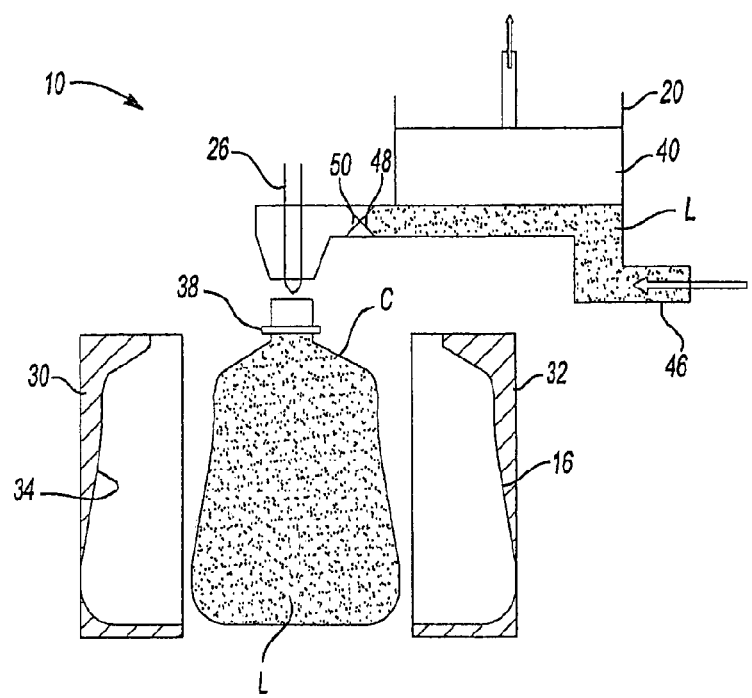
FIG. 7 is a prior art schematic depiction corresponding to FIG. 7 of WO 2009075791 of the system of FIG. 6 wherein the mold halves separate and the piston-like device begins to draw liquid into the pressure source in preparation for the next cycle.
Figure 8:
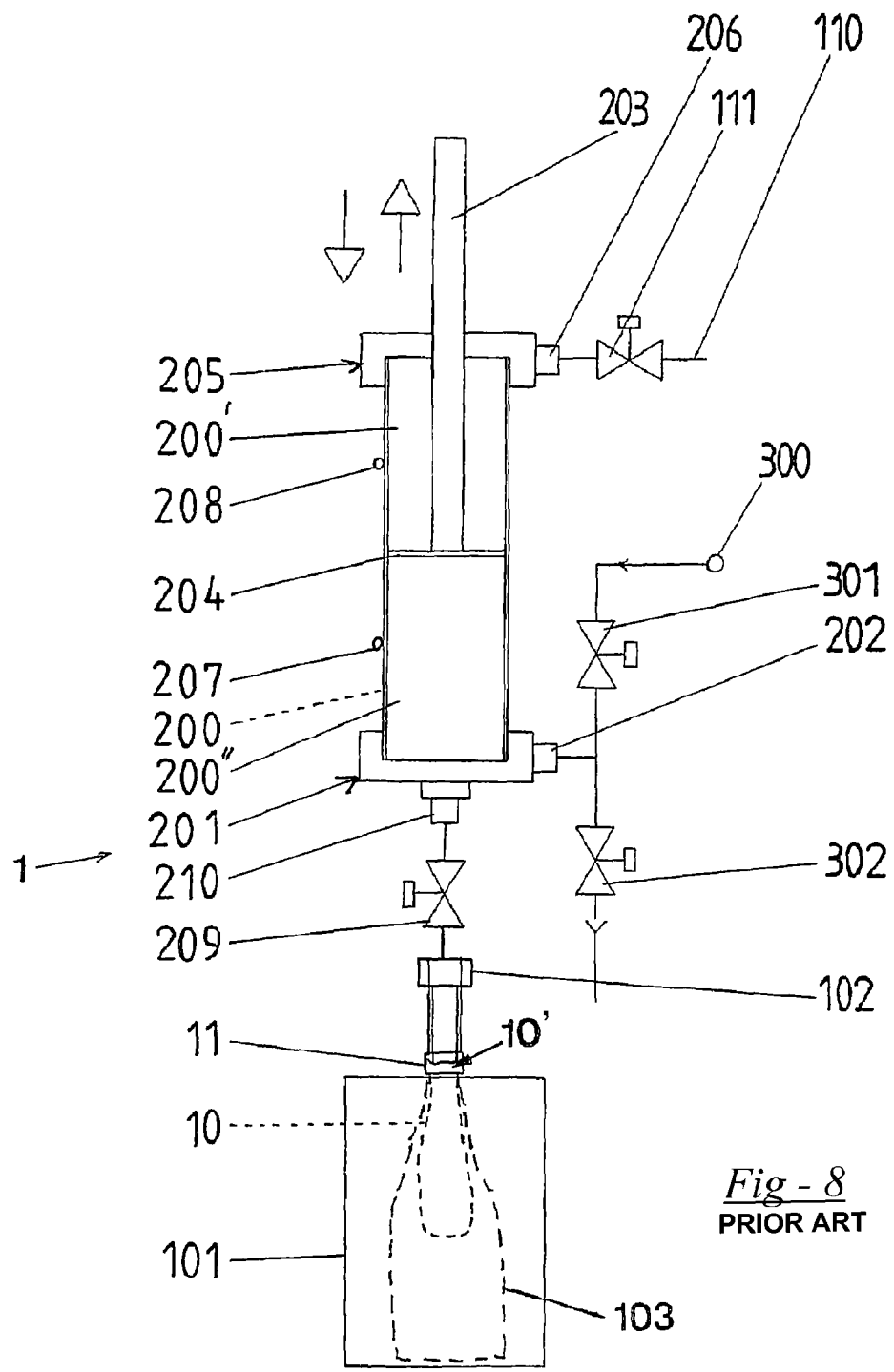
FIG. 8 is a prior art schematic corresponding to the single figure of United States Patent Application No. 20050206045.

This specification describes a special class of polyester polymers which have been discovered to have special advantages when used to make polyester bottles using the preform blow processes when the blowing fluid is incompressible or liquid. For example, the well known re-heat blow and injection blow and injection stretch blow processes described in U.S. Pat. No. 7,141,190, United States Patent Application 20050206045, and WO 2009/075791. All three of these documents are incorporated by reference in their entirety for the purpose of teaching the various processes which utilize a liquid to expand or blow the preform into the shape of a bottle.

What has been discovered is that special class of polyesters show improvements in the above mentioned processes.

Because the special class of polyesters having special advantages in the liquid blowing processes, the various attributes of the liquid blowing processes finding the special polyester polymers useful is reviewed below.

It has also been found advantageous that these resins require much less pressure to blow the bottle using air rather than the traditional bottle grade polyesters The special class of polyester polymers are crystallizable. The term crystallizable means that the polyester polymer can become semi-crystalline, either through orientation or heat induced crystallinity. It is well known that no plastic is completely crystalline and that the crystalline forms are more accurately described as semi-crystalline. The term semi-crystalline is well known in the prior art and is meant to describe a polymer that exhibits X-ray patterns that have sharp features of crystalline regions and diffuse features characteristic of amorphous regions. It is also well known in the art that semi-crystalline should be distinguished from the pure crystalline and amorphous states.

A useful polyester is a crystallizable polyester with more than 85% of its total moles of its acid moieties derived from terephthalic acid or its dimethyl ester wherein the total moles of the acid moieties are 100 mole %. Another useful polyester has more than 90% of its total moles of its acid moieties derived from terephthalic acid or its dimethyl ester, wherein the total moles of the acid moieties are 100 mole %.

The crystallizable polyester will also have a primary comonomer content of at least 2% of the total moles of the acid plus glycol moieties derived from this primary comonomer. The primary comonomer has the functional groups connected by an non-cyclic structure containing more than two carbon atoms and it is preferably selected from the group consisting of the aliphatic diacids, aliphatic di-alcohols or their dimethyl esters. Saturated dimer acids (i.e. Pripol 1009F available from Croda International, PLC located in New Castle Del., USA), sebacic or adipic acid or their respective dimethyl ester are preferred primary comonomers.

Primary glycol co-monomers examples are: polyoxyethylene glycols, Poly(tetramethylene ether)glycols, Polypropylene glycols; 1,6 hexanediol, long chain dimer diol (i.e. Pripol 2033 available from Croda International, PLC located in New Castle Del., USA). The primary comonomer acid or glycol moieties may also be mixture of diacids, di-alcohols or the respective dimethyl ester.

The primary comonomer may also be branched such as isopropylene glycol.

The comonomers of terephthalic acid derived moieties plus ethylene glycol derived moieties together should be present in the range of 90 to 99 mole percent of the total moles of acid plus total moles of glycol moieties, with 99 to 96 mole percent of the total acid plus glycol moieties being most preferred.

The polyester polymer may contain other acid and glycol comonomer moieties, such as isophthalate derived from isophthalic acid or it dimethyl ester. In all cases, the total number of moles of acid moieties is 100% mole % of the moles of acid moieties and the total number of moles of glycol moieties is 100% of the moles of glycol moieties.

Ethylene glycol is the glycol comonomer and should be present in at least 85% (mole %) of the total moles of glycol derived moieties in the polymer.

The polyester polymer can be made using the traditional acid or ester melt polymerization processes and catalysts well known in the art. The melt process can be followed by the solid phase polymerization. In any event, the intrinsic viscosity of the polymer should be less than 0.95 dl/g and greater than 0.50 dl/g, with greater than 0.55 being more preferred, and greater than 0.60 dl/g being even more preferred. The preceding sentence is intended to set upper and lower limitations as well as define the possible ranges of 0.50 to 0.95 dl/g, 0.55 to 0.95 dl/g, and 0.60 to 0.95 dl/g.

The polyester polymer can be further characterized by its melting temperature as determined by DSC at 10° C./min. The Tm (melting temperature) of the second heating should be in the range of 235 to 242° C., with 236 to 241° C. being more preferred with 237 to 240° C. being the most preferred.

The polyester polymer can be further characterized by its glass transition temperature, as measured by DSC at 10° C./min on the second heating. The glass transition temperature or Tg, should be preferably in the range of 60 to 73° C., with 62 to 72° C. being more preferred with 63 to 71° C. being the most preferred.

The primary comonomer and other monomers should be selected so as to keep the polyester polymer in the above specified characterization ranges.

The polyester polymer exhibits a much lower energy to stretch meaning it should take much less energy to form the polymer into a shape. An example is forming a bottle from a preform injection molded of the crystallizable polyester polymer.

EXPERIMENTAL 2 batches of two polyester polymer formulations were made by melt polymerization followed by solid phase polymerization. These polymers had the following composition.

Polyester Polymer 1's recipe was 93 mole % of terephthalic acid, 2 mole % of isophthalic acid and 5 mole % of adipic acid for 100 mole % of the total moles of acid moieties or 1 mole % and 2.5 mole % of the total moles of acid and glycol moieties. There was no glycol added other than ethylene glycol. The final product was analyzed for it moles of acid and glycol moieties yielding 93 mole % of terephthalate moieties derived from terephthalic acid, 2 mole % of isophthalate moieties derived from isophthalic acid and 5 mole % of adipate moieties derived from adipic acid for 100 mole % of the total moles of acid moieties and 97.3 mole % of ethylene glycol and 2.7 mole % of diethylene glycol. Those skilled in the art know that the diethylene glycol is a byproduct reaction and formed in situ.

Polyester Polymer 2's recipe was 93 mole % of terephthalic acid, 2 mole % of isophthalic acid and 5 mole % of sebacic acid for 100 mole % of the total moles of acid moieties. There was no glycol added other than ethylene glycol. The final product was analyzed for it moles of acid and glycol moieties yielding 93 mole % of terephthalate moieties derived from terephthalic acid, 2 mole % of isophthalate moieties derived from isophthalic acid and 5 mole % of sebacate moieties derived from sebacic acid for 100 mole % of the total moles of acid moieties and 97.3 mole % of ethylene glycol moieties and 2.7 mole % of diethylene glycol moieties. Those skilled in the art know that the diethylene glycol is a byproduct reaction and formed in situ.

Polymer 1 and Polymer 2 were characterized as follows:

TABLE I

| Copolymer | Polymer Formula 1 | | Polymer Formula 2 | |
| --- | --- | --- | --- | --- |
| IV (dl/g) | 0.826, 0.840 | 0.812, 0.794 | 0.767, 0.803 | 0.825, 0.771 |
| COOH (Carboxyl meq) | 8 | 12 | 1 | 8 |
| L* | 86.95 | 85.77 | 87.46 | 87.56 |
| a* | −2.17 | −2.07 | −1.93 | −1.37 |
| b* | 5.73 | 5.58 | 7.58 | 7.12 |
| $Tc\_2^{nd}$ (° C.) | 138.89 | 141.25 | 136.47 | 135.96 |
| $Tg\_2^{nd}$ (° C.) | 69.87 | 69.48 | 66.29 | 67.19 |
| $Tm\_2^{nd}$ (° C.) | 238.84 | 238.11 | 237.92 | 238.4 |

These polymers were used to injection mold a preform, placing the preform with a cavity of a mold and expanding the preform within the cavity of a mold by introducing an incompressible fluid, e.g. a liquid under pressure, into the preform located within the mold and stretching the preform to assume the shape of the surrounding mold cavity as described in the prior art processes incorporated into this specification. The liquid can be removed or remain in the blown container which is then sealed with the incompressible fluid remaining in the container. When the incompressible fluid remains in the container, the process is called simultaneous blow/fill as the blowing is actually filling the container with the contents to be packaged in the container.

The comparative example using standard reference polyester resins failed as they produced crystalline bottles.

These resins were also blown using compressed air and it was discovered that the pressure of the compressed air was at least 10% less than the amount used to blow a reference bottle of the same shape from a reference preform of the same preform geometry using a reference polyester control resin of 0.82 dl/g IV polyethylene terephthalate resin modified with approximately 2% IPA. (i.e. the reference polyester resin comprises 98 mole % of its acids are terephthalate moieties, 2 mole % of its acids are isophthalate units with the number of moles of acids totaling 100%. While made from 100 mole % ethylene glycol, the actual reference polyester will contain approximately 97.5 mole % ethylene glycol moieties and 2.5 mole % diethylene glycerol moieties made in situ as part of the process, with the number of moles of glycol moieties totaling 100 mole %.

Thus there is a process for forming a bottle from the preform made using the resins above by placing the preform within a cavity of a mold and expanding the preform within the cavity of the mold by introducing a compressible fluid under a blow pressure into the preform located in the mold and stretching the preform to assume the shape of the surrounding mold cavity, wherein the blow pressure is at 10% less than the blow pressure used to stretch a reference preform into the same mold cavity, wherein the reference preform is made from a reference polyester. The reference preform is a preform of the same geometry as the preform made from the special polyesters except that the reference preform is made from a reference polyester which is 0.82 dl/g IV modified with approximately 2% IPA.

Test Methods

Intrinsic Viscosity

The intrinsic viscosity of intermediate molecular weight and low crystalline poly(ethylene terephthalate) and related polymers which are soluble in 60/40 phenol/tetrachloroethane can be determined by dissolving 0.1 gms of polymer or ground pellet into 25 ml of 60/40 phenol/tetrachloroethane solution and determining the viscosity of the solution at 30° C.+/−0.05 relative to the solvent at the same temperature using a Ubbelohde 1B viscometer. The intrinsic viscosity is calculated using the Billmeyer equation based upon the relative viscosity.

The intrinsic viscosity of high molecular weight or highly crystalline poly(ethylene terephthalate) and related polymers which are not soluble in phenol/tetrachloroethane was determined by dissolving 0.1 gms of polymer or ground pellet into 25 ml of 50/50 trifluoroacetic Acid/Dichloromethane and determining the viscosity of the solution at 30° C.+/−0.05 relative to the solvent at the same temperature using a Type OC Ubbelohde viscometer. The intrinsic viscosity is calculated using the Billmeyer equation and converted using a linear regression to obtain results which are consistent with those obtained using 60/40 phenol/tetrachloroethane solvent. The linear regression is IV in 60/40 phenol/tetrachloroethane=0.8229×IV in 50/50 trifluoroacetic Acid/Dichloromethane+ 0.0124

Hunter L*, a*, B*

The Color Measurement

The measurements were taken on amorphous resin. A HunterLab ColorQUEST Sphere Spectrophotometer System, assorted specimen holders, and green, gray and white calibration tiles, and light trap was used. The HunterLab Spectrocolorimeter integrating sphere sensor is a color and appearance measurement instrument. Light from the lamp is diffused by the integrating sphere and passed either through (transmitted) or reflected (reflectance) off an object to a lens. The lens collects the light and directs it to a diffraction grating that disperses it into its component wave lengths. The dispersed light is reflected onto a silicon diode array. Signals from the diodes pass through an amplifier to a converter and are manipulated to produce the data. Spectral data is provided by the software.

I claim:

1. A process to form a polyester container from a polyester preform having an opening at the level of a neck, the process comprising utilizing an expansion step carried out with a cavity or a mold, wherein, during said expansion step, an incompressible fluid is injected through the opening of said preform to form said container; characterized in that the polyester preform comprises
a crystallizable polyester polymer comprised of acid moieties and glycol moieties, with at least 85% of the total moles of acid moieties being terephthalate derived from terephthalic acid or its dimethyl ester and at least 85% of the total moles of glycol moieties derived from ethylene glycol and with at least 2% of the total moles of acid plus glycol moieties derived from a primary comonomer with the mole percents of the acid plus glycol moieties totaling 100 mole %,
wherein the primary comonomer has functional groups connected by a non-cyclic structure containing more than two carbon atoms, and wherein the crystallizable polyester has a melting temperature in the range of 235 to 242° C. and a glass transition temperature in the range of 60° C. to 73° C.

2. The process of claim 1, wherein the primary comonomer is selected from the group consisting of aliphatic diacids or their dimethyl esters.

3. The process of claim 1, wherein the primary comonomer is selected from the group consisting of sebacic acid, adipic acid, and their respective dimethyl esters.

4. The process of claim 1, wherein the primary comonomer is present in the range of 1 to 10 mole % of the total moles of acid moieties in the crystallizable polyester.

5. The process of claim 1, wherein the cyrstallizable polyester has an intrinsic viscosity in the range of 0.50 to 0.95 dl/g.

6. The process of claim 1, wherein the crystallizable polyester has a glass transition temperature in the range of 63° C. to 71° C.

7. A process for forming a polyester container from a polyester preform, comprising placing the preform within a cavity of a mold and expanding the preform within the cavity of the mold by introducing a compressible fluid under a blow pressure into the preform located in the mold and stretching the preform to assume the shape of the surrounding mold cavity, wherein the polyester preform comprises
a crystallizable polyester polymer wherein the polyester polymer is comprised of acid moieties and glycol moieties, with at least 85% of the total moles of acid moieties being terephthalate derived from terephthalic acid or its dimethyl ester and at least 85% of the total moles of glycol moieties derived from the ethylene glycol and with at least 2% of the total moles of acid plus glycol moieties derived from a primary comonomer with the mole percents of the acid plus glycol moieties totaling 100 mole %;

and wherein the blow pressure is at 10% less than the blow pressure used to stretch a reference preform into the same mold cavity, wherein the reference preform is made with 98% of the total moles of acid moieties being terephthalate moieties, 2% of the total moles of acid moieties being isophthalate moieties and 100% of the total moles of glycol moieties derived from ethylene glycol.

8. The process of claim 7, wherein the primary comonomer is selected from the group consisting of the aliphatic diacids or their dimethyl esters.

9. The process of claim 7, wherein the primary comonomer is selected from the group consisting of sebacic acid, adipic acid and their respective dimethyl ester.

10. The process of claim 7, wherein the primary comonomer is present in the range of 1 to 10 mole % of the total acid moieties in the crystallizable polyester.

11. The process of claim 7, wherein the crystallizable polyester has an intrinsic viscosity in the range of 0.50 to 0.95 dl/g.

12. The process of claim 7, wherein the crystallizable polyester has a melting temperature in the range of 235° C. to 242° C.

13. The process of claim 7, wherein the cyrstallizable polyester has a glass transition temperature in the range of 60° C. to 73° C.

14. The process of claim 1, wherein the primary comonomer is selected from the group consisting of sebacic acid, adipic acid, sebacic dimethyl ester, adipic dimethyl ester, saturated dimer acids, polyethylene glycols, poly(tetramethylene ether) glycols, polypropylene glycols, 1,6-hexanediol, long chain dimer diol, isopropylene glycol, and combinations thereof.

* * * * *